Patented Dec. 19, 1939

2,184,040

UNITED STATES PATENT OFFICE 2,184,040

TREATING TEXTILES AND OILS THEREFOR

Walter Garner, Menston-in-Wharfdale, England

No Drawing. Application August 28, 1937, Serial No. 161,530. In Great Britain August 31, 1936

6 Claims. (Cl. 87—9)

This invention relates to improvements in treating textile materials and more particularly those consisting of or containing animal hairs. The invention further relates to improvements in the treatment of oils and waxes and especially those containing unsaturated glycerides or unsaturated esters or unsaturated acids or unsaturated alcohols, or oily or waxy materials of similar composition, for example olive oil, arachis oil, oleic acid, cyclohexanol oleate, diglycol oleate, oleyl alcohol and sperm oil.

The unsaturated constituents are liable to oxidation especially in presence of naturally occurring catalysts, which may initiate or accelerate strongly exothermic reactions in the Mackey test, Jour. Soc. Chem. Ind., 1896 (15), 90. It is generally considered that the suitability of an oil for wool combing or like purposes is indicated by the absence of any pronounced exothermic oxidation reactions in the Mackey test.

According to the invention the oil is modified by treatment with certain substances hereinafter defined in such a manner that these exothermic oxidation reactions are hindered or reduced in violence or stopped.

The invention particularly consists in processes in which such oils and waxes are treated with sulphur or sulphur compounds as oxidation inhibitors.

The invention further consists in treating textile materials with the modified oils.

The commercially suitable inhibitors possess the following general properties.

1. Solubility in the oil to at least 0.01%.
2. Addition of not more than 1% to a solution of 0.1% ferric oleate in pure ethyl oleate is sufficient to reduce the extent of the rise in temperature above the 212° F. in the Mackey test.

Within the above limitations the following classes of substances may be employed as inhibitors:

(a) Sulphur.
(b) Mercaptans, disulphides, thioureas, guanidines, carbamates, thiocarbamates, dithiocarbamates, thiurams, thiazoles.

Examples of suitable sulphur compounds, which have been tested and found satisfactory are:

Tetra methyl thiuram disulphide.
Tetra ethyl thiuram disulphide.
Thioglycolic acid.
Thialdine (BDH).
OVAC (a combination of mercapto methylene aniline and mercapto methylene toluidine.
ONV (diphenyl carbamyl dimethyl dithiocarbamate).
Thiuram DS.
Diphenyl thiourea.
Thiourea metho sulphate.
Thiocarbanilide.
Thio semi carbazide.
Thio acetanilide.
Thio diphenylamine.
Tetraethylthiuramdisulphide.
Mercaptobenzthiazole.

In each case 0.1% of the compound was added. Most of these compounds are accelerators of vulcanisation of rubber.

A particularly important feature of the invention consists in treating the above described oils with sulphur itself to inhibit oxidation.

It is found that such inhibition can be brought about by dissolving small amounts of elemental sulphur in the oil. At ordinary temperatures solution is very slow, but can be accelerated by heating, and is reasonably rapid at 110–130° C. An oil treated by mere solution of the sulphur resists oxidation much better than the untreated oil, but has the disadvantage for some purposes that certain metals, e. g., mercury, copper, lead, in contact with it are rapidly stained even at normal temperatures.

This invention therefore includes also the incorporation of elemental sulphur in such a manner that the oil does not stain metal surfaces. This can be done by heating the oil containing dissolved sulphur to above a critical temperature which varies with different oils, but is below about 200° C. for most vegetable oils. The sulphur apparently combines with some constituent of the oil and practically no staining of mercury, copper or lead occurs at normal temperatures.

Such products though they resist oxidation much better than untreated oils may have the disadvantage for some purposes of a dark colour if the sulphur addition be not made using certain precautions. When an attempt is made to dissolve ¼% of crushed brimstone in an oil at 200° C. the sulphur first melts into small globules and these then react locally with the hot oil to form very dark brown bodies not easily dissolved which when in solution, colour the oil, especially if subjected to local overheating by continued contact with the sides of the heating vessel. Unduly prolonged heating at an unnecessarily high temperature also causes excessive darkening; the use of a large excess of sulphur is also to be avoided.

This invention includes also the incorporation of elemental sulphur in such a manner that the oil is not unduly darkened in colour as a result of heating to the high temperatures necessary to prevent staining of metals in the cold.

This can be done by proceeding in one of the following ways:

1. The sulphur may be in complete solution in the oil below the critical temperature for the oil, and preferably below 125° C., before heating to above the critical temperature, e. g., to 180° C.
2. The sulphur may be added to the oil maintained at a temperature above the critical temperature for the oil, e. g., at 180° C., in the form of a concentrated solution of sulphur in the oil.
3. The sulphur may be added to the oil maintained at a temperature above the critical temperature for the oil, e. g., (for linoleic acid) at 180° C. in a form which dissolves rapidly at this temperature (e. g., as a suspension of fine crystals obtained by dissolving sulphur in a portion of the oil blow 125° C. and cooling rapidly to 20° C.)
4. The sulphur may be added according to Method 2 but as a concentrated solution in a volatile solvent such as carbon disulphide, followed by subsequent removal of the solvent by evaporation or distillation.

Example 1

The use of sulphur as an antioxidant may be illustrated by the following example relating to refined arachis oil.

Five parts sulphur are dissolved in 100 parts of the oil at 120° C. with stirring. This solution on cooling rapidly to 20° C. deposits crystals of sulphur which are very easily soluble in a sufficiency of hot oil, or even cold oil.

1,900 parts of the oil are heated to 200° C. and the above 100 parts of oil containing 5 parts of sulphur either in hot solution or cold suspension are added with stirring. The oil is maintained at 200° C. for about half an hour and is allowed to cool.

Alternatively the above 100 parts of oil containing 5 parts sulphur in hot solution are added to 1,900 parts of oil at room temperature, the temperature raised to 200° C. and maintained at the temperature for a few minutes.

The product does not stain copper cold, or even when heated in contact with the metal except after heating at high temperature. The refining of the raw oil removes bodies which would cause darkening.

Example 2

A commercial oleic acid preferably vacuum distilled in apparatus constructed, so far as those parts coming into contact with the acid are concerned, of metals which do not form dark coloured sulphides, is treated as in the preceding example. The resultant product is of increased stability to oxidation. When saponified by means of solutions of mild alkalis such as sodium carbonate the treated acid forms soaps which practically speaking are free from sodium sulphide; such soaps are more resistant to air oxidation than soaps made from the untreated acid and their aqueous solutions do not blacken copper or lead.

In general, the production of a light- or medium-coloured oil depends on observance of the following points:

(a) Vacuum distillation to remove pitch.
(b) Heating at the lowest temperature which will produce a non-staining oil.
(c) Using the minimum amount of sulphur which will give a good Mackey test.
(d) Heating at the high temperature for as short a time as will give a non-staining oil, since the non-staining inhibitors appear to decompose by heating to form highly coloured bodies.

I declare that what I claim is:

1. Process of producing a non-staining textile oil not darker than a medium colour which comprises incorporating in a textile oil containing unsaturated substances a small proportion of solid sulphur of the order of 0.1% to 0.25% and heating the mixture at the lowest temperature which will produce a non-staining oil.
2. Process as in claim 1 in which the sulphur is completely dissolved in oil at a low temperature before heating to produce a non-staining oil.
3. Process as in claim 1 in which a concentrated solution of sulphur is added to a body of heated oil.
4. Process as in claim 1 in which sulphur is converted into a rapidly soluble form and added to a body of heated oil.
5. Process as in claim 1 in which the oil and sulphur is heated to about 180°–200° C.
6. A textile oil not darker than a medium colour containing unsaturated substances and a small proportion of an oxidation inhibitor consisting of a non-metal-staining organic sulphur compound prepared by the process of claim 1.

WALTER GARNER.